US006794846B2

(12) United States Patent
Tsuji (10) Patent No.: US 6,794,846 B2
(45) Date of Patent: Sep. 21, 2004

(54) POWER SOURCE UNIT (75) Inventor: Kimitoshi Tsuji, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 10/291,616

(22) Filed: Nov. 12, 2002

(65) Prior Publication Data
US 2003/0090235 A1 May 15, 2003

(30) Foreign Application Priority Data
Nov. 14, 2001 (JP) ........................................ 2001-349130

(51) Int. Cl.$^7$ ............................................... C08F 4/26
(52) U.S. Cl. ....................................................... 320/103
(58) Field of Search ................................. 320/103, 104, 320/138; 363/29, 30, 31, 131, 132

(56) References Cited

U.S. PATENT DOCUMENTS 5,659,237 A * 8/1997 Divan et al. ................. 320/119
5,671,128 A * 9/1997 Nakamura et al. ............ 363/44
6,297,616 B1 * 10/2001 Kubo et al. .................. 320/116
6,476,571 B1 * 11/2002 Sasaki ........................... 307/64

FOREIGN PATENT DOCUMENTS

JP         A 2000-50402        2/2000

* cited by examiner

Primary Examiner—Pia Tibbits
(74) Attorney, Agent, or Firm—Oliff & Berridge, PLC (57) ABSTRACT A power source unit includes an inverter connected to a power transfer device, a first battery that can be charged and discharged through the inverter and a second battery that can be charged and discharged through the inverter. The second battery has a power voltage lower than that of the first battery. The power source unit further includes a power conversion device connected to the inverter, providing a transforming function, and a switching device provided between the power conversion device and the first and second batteries. The switching device switches a connection between the power conversion device and the first battery, and the power conversion device and the second battery. The inverter is connected to the first and the second batteries through the power conversion device.

9 Claims, 5 Drawing Sheets

POWER SOURCE UNIT

INCORPORATION BY REFERENCE

The disclosure of Japanese Patent Application No. 2001-349130 filed on Nov. 14, 2001 including the specification, drawings and abstract is incorporated herein by reference in its entirety.

BACKGROUND OF THE INVENTION

1. Field of Invention

The invention relates to a power source unit of a vehicle and the like. More particularly, the invention relates to a power source unit in which a plurality of chargeable/dischargeable batteries are provided.

2. Description of Related Art

Figure 5:
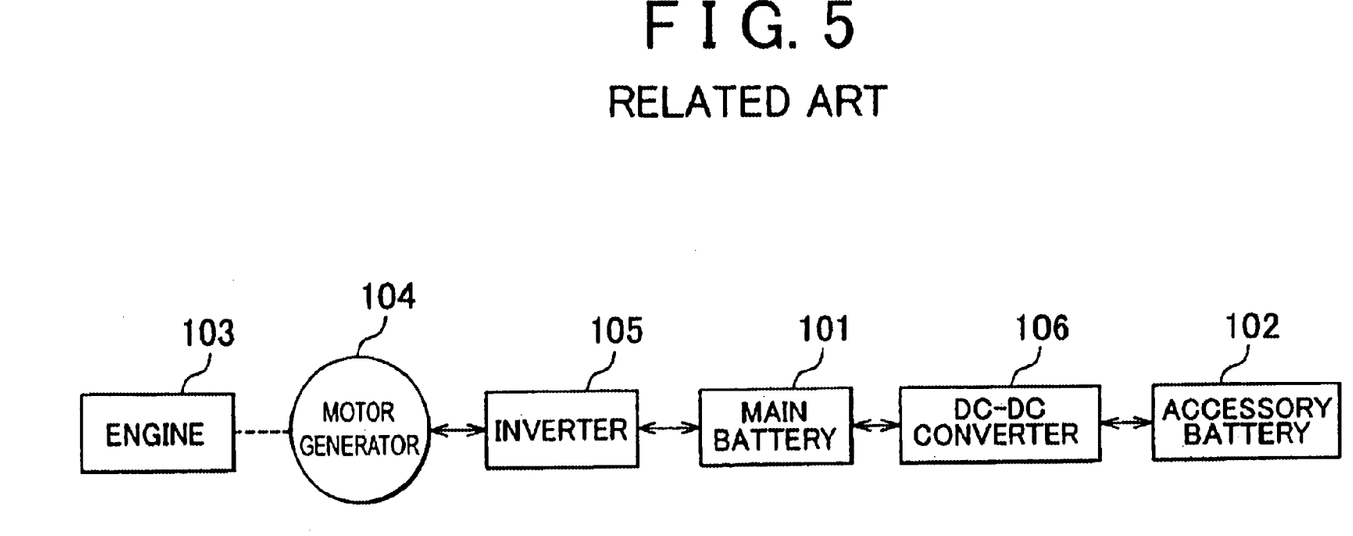
FIG. 5 is an explanation view of a related art.

As a power source unit having a plurality of chargeable/dischargeable batteries, there is a known power source unit, as disclosed in Japanese Patent Application Laid-Open No. 2000-50402, which is mounted in a hybrid vehicle having a combination of an internal combustion engine and a motor. More specifically, as shown in FIG. 5, a power source unit including a high voltage main battery 101 and a low voltage accessory battery 102 causes a motor generator (M/G) 104 to generate electric power by driving an engine 103. The power source unit then charges the main battery 101 via an inverter 105 such that the motor generator 104 is driven by electric power of the main battery 101. A DC-DC converter 106 is provided between the main battery 101 and the accessory battery 102 so as to transfer power therebetween.

The aforementioned power source unit requires the DC-DC converter 106 for the purpose of charging and discharging the accessory battery 102. This may result in the cost increase. More specifically, the DC-DC converter requires a converter including an AC/DC converting circuit at a high voltage side, an AC/DC converting circuit at a low voltage side, a transformer and the like, and a step-up switching circuit required for charging the main battery 101 by the accessory battery 104. The resultant configuration of the DC-DC converter 106, thus, becomes complicated, increasing the cost.

SUMMARY OF THE INVENTION

It is an object of the invention to provide a power source unit that allows charging and discharging of a plurality of batteries at low costs.

According to an exemplary embodiment of the invention, a power source unit includes an inverter connected to a power transfer device, a first battery that can be charged and discharged through the inverter, and a second battery that can be charged and discharged through the inverter. A power voltage of the second battery is lower than that of the first battery. The power source unit further includes a power conversion device connected to the inverter, providing a transforming function, and a switching device provided between the power conversion device and the first and second batteries. The switching device switches a connection between the power conversion device and the first battery, and the power conversion device and the second battery. The inverter is connected to the first and the second batteries through the power conversion device. The power conversion device includes a transformer, a first bridge circuit connected to a primary side of the transformer, and a second bridge circuit connected to a secondary side of the transformer.

Further, the switching device includes a switching circuit that switches the connection between the power conversion device and the first battery, and the power conversion device and the second battery.

Still further, the switching device includes a coil connected between the first battery and the second battery through the switching circuit. The power transfer device includes a motor generator, and the inverter allows rectification of an alternating output of the motor generator so as to supply an alternating current to the motor generator.

The power source unit is preferably provided in a hybrid vehicle driven by the power transfer device for a running operation.

According to the aforementioned embodiment that allows switching of the connection between the power converter and the first battery, and the power converter and the second battery, electric power generated by the power transfer unit can be selectively supplied to the first battery or the second battery for charging. It is also possible to selectively supply electric power stored in the first battery or the second battery to the power transfer unit. The exemplary embodiment of the invention does not require a step-up circuit such as the DC-DC converter in addition to the converter. As a result, the first battery and the second battery can be charged/discharged without the converter, thus reducing the cost for parts.

Moreover, as the inverter is connected to the first battery and the second battery through the converter, it is possible to bring an input/output voltage on the battery side of the inverter into a high voltage state. This feature makes it possible to use components of low electric current type for forming the inverter, thus reducing the size and cost of the inverter. This feature becomes especially effective when one of the first battery and the second battery at the high voltage side is of 30 to 42 V type.

Furthermore, the coil connected between the first battery and the second battery via the switching circuit may cause the power converter and the switching unit to function as the step-up choppers so as to allow power transfer between the first and the second batteries.

DETAILED DESCRIPTION OF EXEMPLARY EMBODIMENTS

Referring to the drawings, various embodiments of the invention will be explained in detail. In the drawings, the same components have the same reference numeral, and the same explanations will be omitted.

First Embodiment

Figure 1:
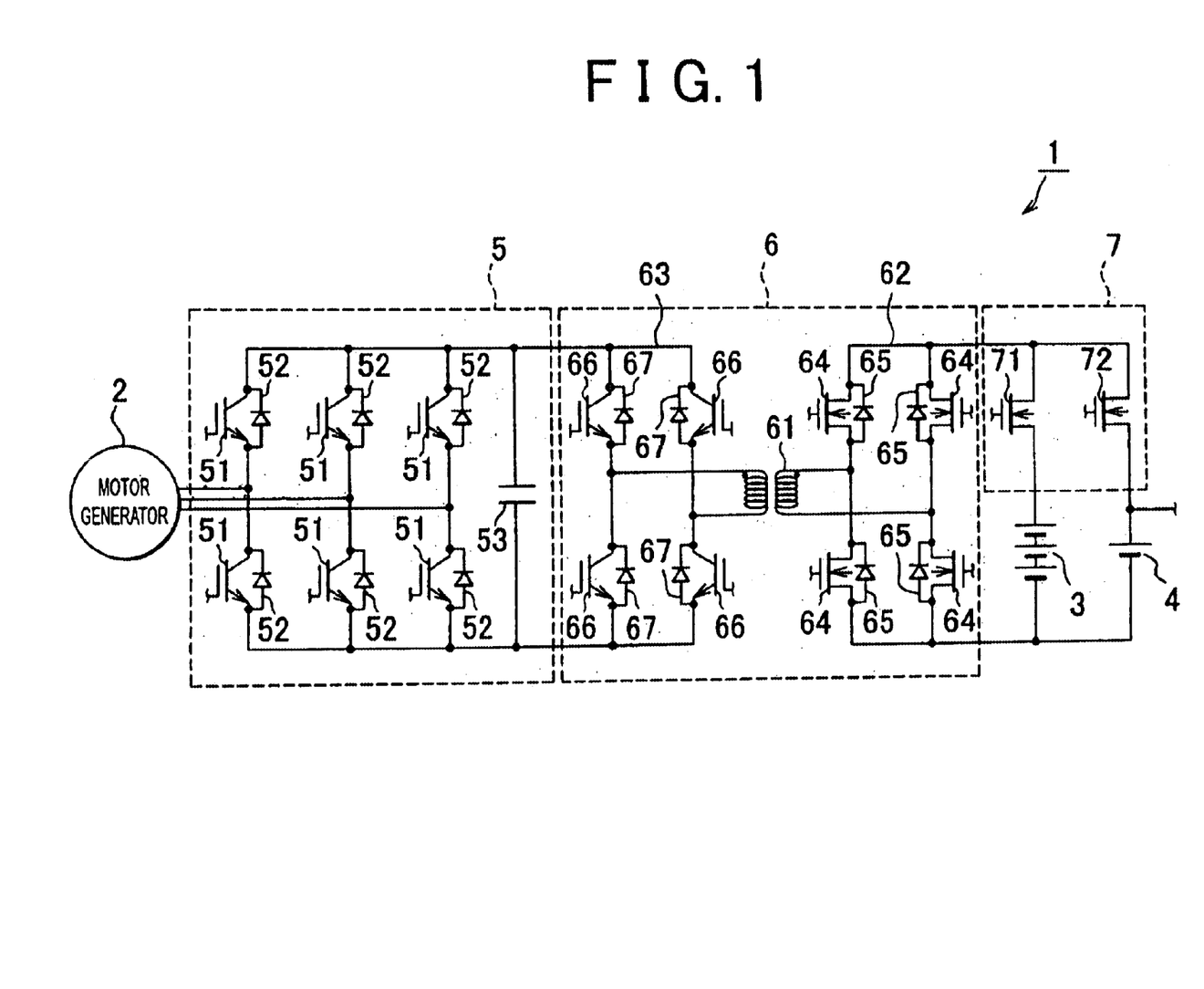
FIG. 1 is an exemplary view of a power source unit according to a first embodiment of the present invention.

FIG. 1 is an exemplary schematic view of a power source unit of a first embodiment. As shown in FIG. 1, a power source unit 1 is mounted on a hybrid vehicle having a combination of an engine and a motor generator 2. The power source unit 1 can be mounted on any type of the hybrid vehicle including a series type in which wheels are driven by a motor generator, and an engine serves to supply power to the motor generator 2, a parallel type in which wheels can be driven by both an engine and a motor generator, or a parallel series type in which functions of both the series type and the parallel type can be obtained.

The power source unit 1 has a main battery 3 and an accessory battery 4. The main battery 3, for example, as a chargeable/dischargeable first battery, mainly serves to supply electricity to the motor generator 2. The main battery 3 is of a higher voltage type, DC 36 to 40 V, for example, compared with the accessory battery 4. The accessory battery 4, for example, as a chargeable/dischargeable secondary battery, supplies electricity to accessories mounted on the vehicle and to the motor generator 2 as necessary. The accessory battery 4 is of a lower voltage type, DC 12 to 14 V, for example, compared with the main battery 3.

The motor generator 2 is connected to an inverter 5 that rectifies AC output of the motor generator 2 to which the AC power is supplied. The inverter 5 includes a three-phase bridge circuit formed of six transistors 51. A diode 52 is connected between a collector terminal and an emitter terminal of each of the transistors 51 in a reverse direction.

A base of each of the transistors 51 is connected to a control unit (not shown). The inverter 5 is provided with a capacitor 53 for the purpose of stabilizing DC voltage. Each of the transistors 51 of the inverter 5 is controlled in accordance with a control signal from the control unit so as to conduct conversion between the direct current and the three-phase alternating current.

The inverter 5 is connected to the main battery 3 and the accessory battery 4 via a power converting circuit 6 and a switching circuit 7. The power converting circuit 6 having a transforming function is provided with a transformer 61, a first bridge circuit 62 and a second bridge circuit 63. The first bridge circuit 62 is connected to the primary side of the transformer 61, and the second bridge circuit 63 is connected to the secondary side of the transformer 61.

The first bridge circuit 62 includes four transistors 64, in which each of diodes 65 is connected between the drain terminal and the source terminal of the transistor 64 in a reverse direction, respectively. A FET (Field Effect Transistor) may be used as the transistor 64, for example. Each of gate terminals of the respective transistors 64 is connected to a control unit (not shown). The respective transistors 64 are controlled in accordance with control signals sent from the control unit to the gate terminals of the respective transistors 64. As a result, the alternating current the transformer 61 is rectified, or direct current of the main battery 3 and so on is converted to the alternating current.

The second bridge circuit 63 includes four transistors 66, in which each of diodes 67 is connected between each collector terminal and emitter terminal of the respective transistors 66 in a reverse direction. Each base terminal of the respective transistors 66 is connected to the control unit (not shown). Each of the transistor 66 is controlled in accordance with control signals sent from the control unit to the base terminal of the transistor 66. As a result, the alternating current of the transformer 61 is rectified, or direct current of the inverter 5 is converted to an alternating current.

The switching circuit 7 functions to switch connection between the power converting circuit 6 and the main battery 3, and the power converting circuit 6 and the accessory battery 4. A transistor 71 is disposed as a switching element between the first bridge circuit 62 and the main battery 3 in the switching circuit. A transistor 72 is disposed as another switching element between the first bridge circuit 62 and the accessory battery 4 in the switching circuit.

The FET may be used as the transistor 71. A drain terminal and a source terminal of the transistor 71 are connected to the first bridge circuit 62 and the positive terminal of the main battery 3, respectively. The gate terminal of the transistor 71 is connected to the control unit (not shown).

The FET may be used as the transistor 72. A drain terminal and a source terminal of the transistor 72 are connected to the first bridge circuit 62 and the positive terminal of the accessory battery 4, respectively. The gate terminal of the transistor 72 is connected to the control unit (not shown).

The power converting circuit 6 is connected to the main battery 3 by turning the transistor 71 on and turning the transistor 72 off so as to allow power transfer between the inverter 5 and the main battery 3.

The power converting circuit 6 is connected to the accessory battery 4 by turning the transistor 71 off and turning the transistor 72 on so as to allow power transfer between the inverter 5 and the accessory battery 4.

An operation of the power source unit according to the embodiment will be described. The operation of the power source unit 1 upon charging of the battery will be described.

Referring to FIG. 1, a three-phase alternating current is input to the inverter 5 from the motor generator 2. Each transistor 51 of the inverter 5 is switched by the control unit (not shown) so as to convert the alternating current to the direct current.

Then, the direct current is input from the inverter 5 to the power converting circuit 6 in which the direct current is converted into the alternating current by the second bridge circuit 63. The alternating current is stepped down to the low voltage by the transformer 61, and rectified by the first bridge circuit 62. The rectified current is then converted into the direct current by the first bridge circuit 62.

Each of the transistors 66 of the second bridge circuit 63 is switched by the control unit (not shown). This feature makes it possible to have the direct current converted into the alternating current synchronously with the switching cycle. Each of the transistors 64 of the first bridge circuit 62 is turned off. The first bridge circuit 62 serves as the full wave converter circuit by the diodes 65, by which the alternating current is converted into the direct current. This feature makes it possible to control the current transformed in the power converting circuit 6 by changing the duty ratio upon switching of the transistor 66 in the second bridge circuit 63. As a result, the DC voltage generated by the first bridge circuit 62 can be adjusted.

The direct current is supplied from the power converting circuit 6 to the switching circuit 7 where the control unit (not shown) turns on the transistor 71 or the transistor 72. The main battery 3 can be charged by turning on the transistor 71. The accessory battery 4 can be charged by turning on the transistor 72. As aforementioned, the main battery 3 or the accessory battery 4 can be selectively charged by switching the switching circuit 7.

An operation of the power source unit 1 upon driving of the motor generator will be described. Referring to FIG. 1, the transistor 71 is set to the on state by supplying electricity stored in the main battery 3 to the power converting circuit 6 via the switching circuit 7. Meanwhile the transistor 72 is set to the on state by supplying electricity stored in the accessory battery 4 to the power converting circuit 6 via the switching circuit 7.

In the power converting circuit 6, the direct current supplied from the switching circuit 7 is converted into the alternating current through the first bridge circuit 62. The alternating current is then stepped up to high voltage using the transformer 61, and is rectified through the second bridge circuit 63 so as to be converted into the direct current.

The control unit (not shown) performs control for switching the transistors 64 of the first bridge circuit 62 so as to convert the direct current to the alternating current synchronous with the switching cycle. The respective transistors 66 of the second bridge circuit 63 are set in an off state. As a result, the diode 67 causes the second bridge circuit 63 to serve as a full wave converting circuit so as to convert the alternating current to the direct current. At this time, the change in the transformation performed in the power converting circuit 6 can be controlled by changing the duty ratio upon switching operation of the transistor 64 in the first bridge circuit 62. This feature makes it possible to adjust the DC voltage output from the second bridge circuit 63.

The direct current is supplied from the power converting circuit 6 to the inverter 5 where switching control of transistors 51 is performed. The supplied direct current is further supplied to the motor generator 2 in the form of the three-phase alternating current so as to drive the motor generator 2.

In the power source unit 1, the switching circuit 7 allows switching of the connection between the power converting circuit 6 and the main battery 3, and the power converting circuit 6 and the accessory battery 4. The power generated by the motor generator 2 can be selectively supplied to the main battery 3 or the accessory battery 4 for charging. The power stored in the main battery 3 or the accessory battery 4 can also be selectively supplied to the motor generator 2. The power source unit 1 allows charging/discharging of the main battery 3 and the accessory battery 4 without the booster circuit like the DC—DC converter to be added to the power converting circuit 6, thus reducing costs.

As the inverter 5 is connected both to the main battery 3 and the accessory battery 4 via the power converting circuit 6, the input/output voltage of the inverter 5 at the battery side can be set to the high voltage state. This feature makes it possible to use the transistor 51 requiring less power as a component of the inverter 5, thus reducing the size and cost of the inverter 5.

Where the main battery 3 is of higher power type compared with the accessory batter 4, that is, 30–42 V type and the inverter 5 is directly connected to the main battery 3 without providing the power converting circuit 6 therebetween, the low power voltage between 30 and 42 V is transformed through the inverter 5, requiring the transistor 51 of high current type. The resultant cost of the transistor 51 is thus increased, increasing the size of the inverter 5. The power source unit 1 according to the embodiment having the power converting circuit 6 through which the inverter 5 is connected to the main battery 3 eliminates this problem.

Second Embodiment

Figure 2:
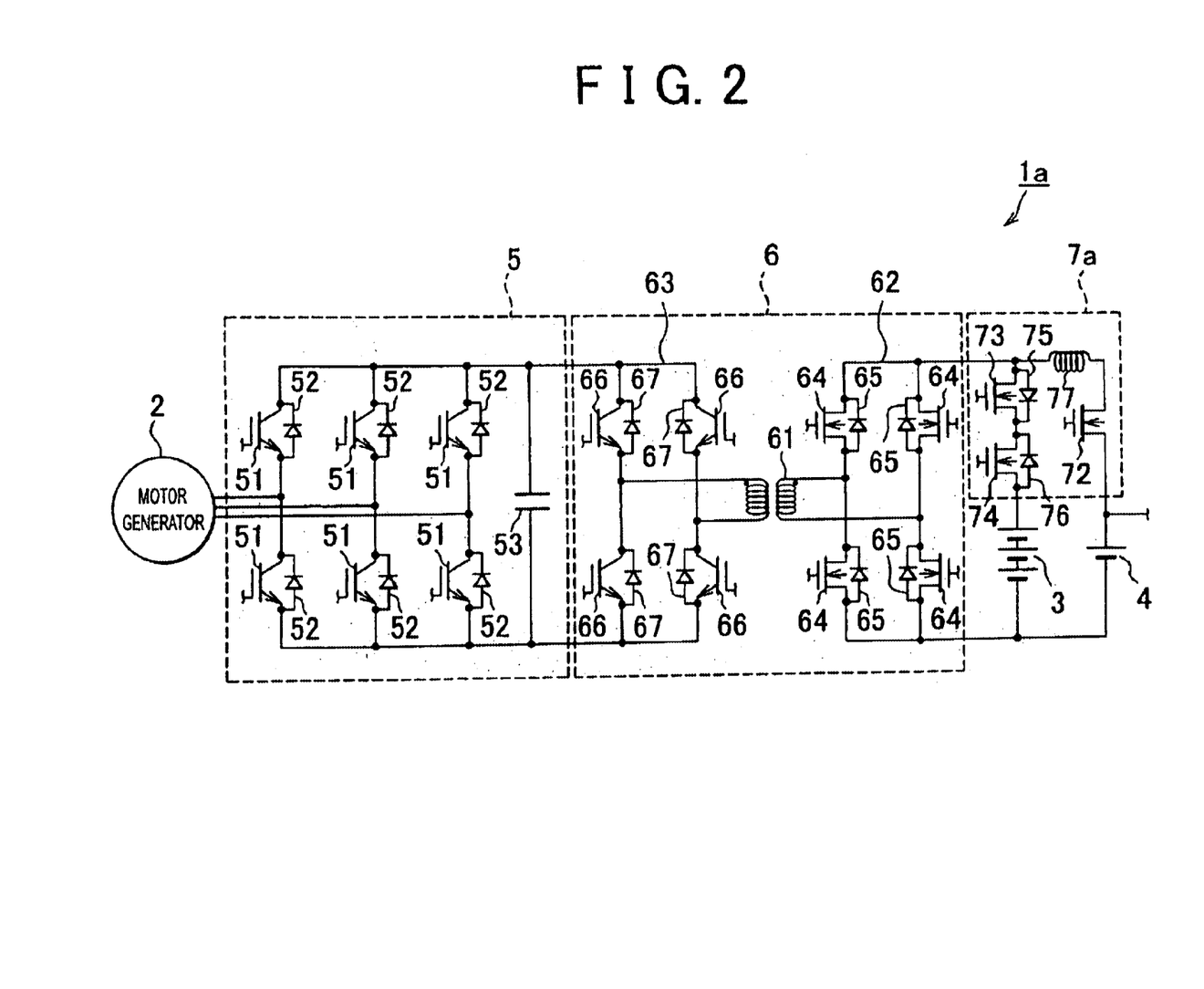
FIG. 2 is an exemplary view of a power source unit according to a second embodiment.

FIG. 2 is an exemplary schematic view of a power source unit according to a second embodiment. As shown in FIG. 2, a power source unit 1a has a similar configuration as that of the power source unit 1 of the first exemplary embodiment. That is, the power source unit 1a has a main battery 3, accessory battery 4, inverter 5, and power converting circuit 6. Like the switching circuit 7 of the first embodiment, a switching circuit 7a of the power source unit 1a serves to switch the connection between the power converting circuit 6 and the main battery 3 and the power converting circuit 6 and the accessory battery 4. The switching circuit 7a and the second bridge circuit 62 constitute the step-up chopper so as to allow power transfer between the main battery 3 and the accessory battery 4.

In the switching circuit 7a, a transistor 73 and a transistor 74 are connected in series between the first bridge circuit 62 and the main battery 3. A coil 77 and the transistor 72 are connected in series between the first bridge circuit 62 and the accessory battery 4. The transistors 72, 73, 74 in the form of FETs, for example, function as switching elements. The operation for switching among those transistors 72, 73, 74 is controlled by a control unit (not shown).

A diode 75 is provided between a drain terminal and a source terminal of the transistor 73 in a forward direction from the first bridge circuit 62 to the main battery 3. A diode 76 is provided between a drain terminal and a source terminal of the transistor 74 in a reverse direction from the first bridge circuit 62 to the main battery 3.

An operation of the power source unit 1a according to the embodiment upon charging of the battery will be described. The electric current generated by the motor generator 2 flows to the inverter 5 in the form of the three-phase alternating current. The alternating current is converted into the direct current by the inverter 5.

The direct current flows from the inverter 5 into the power converting circuit 6 in which the direct current is converted into the alternating current by the second bridge circuit 63. The alternating current is stepped down to a low voltage by the transformer 61, and the alternating current stepped down by the first bridge circuit 62 is rectified and converted into the direct current. The inverter 5 and the power converting circuit 6 are operated in the similar way as in the power source unit 1 of the first embodiment.

The direct current flows from the power converting circuit 6 to the switching circuit 7a in which the control unit (not shown) keeps at least the transistors 73, 74 and the transistor 72 in the on state. When the transistors 73, 74 are turned to the on state, the main battery 3 is ready to be charged. Meanwhile, when the transistor 74 is turned to the on state, the accessory battery 4 is ready to be charged. The main battery 3 and the accessory battery 4 can be selectively charged by operating the switching circuit 7a.

The operation of the power source unit 1a upon driving the motor generator will be described. Referring to FIG. 2, the transistors 73, 73 or the transistor 72 of the switching circuit 7a. An operation at the time of driving the motor generator in the power source unit 1a will be described. In FIG. 2, both the transistors 73, 74 or the transistor 72 of the switching circuit 7 is brought into on state. When the transistors 73, 74 are set in the on state, the power stored in the main battery 3 is supplied to the power converting circuit 6 through the switching circuit 7a. When the transistor 72 is set in the on state, the power stored in the accessory battery 4 is supplied to the power converting circuit through the switching circuit 7a.

The direct current flows from the switching circuit 7a to the power converting circuit 6 in which the direct current is converted into the alternating current by the first bridge circuit 62. The alternating current is stepped up to a high voltage by the transformer 61. The stepped up alternating current is rectified and converted into the direct current by the second bridge circuit 63.

Figure 3:
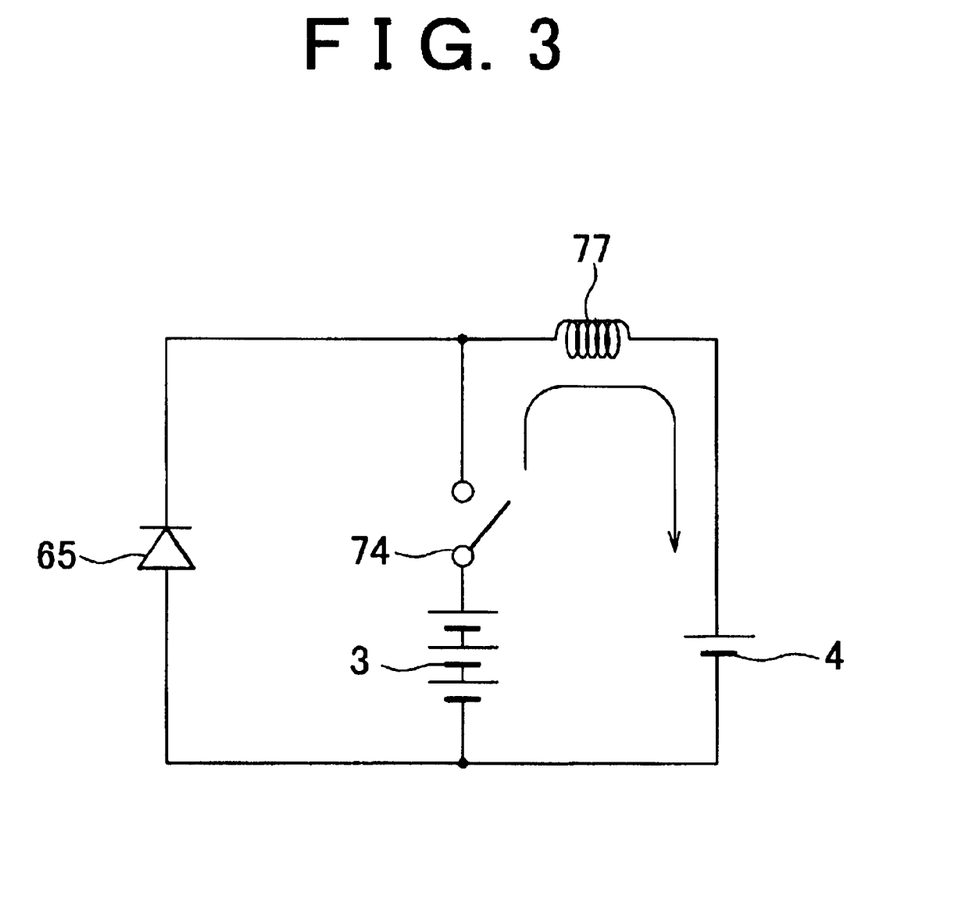
FIG. 3 is an exemplary equivalent circuit view during operation of the power source unit of FIG. 2.

Referring to the exemplary equivalent circuit shown in FIG. 3, the transistor 74 and the coil 77 of the switching circuit 7a, and the diode 65 of the power converting circuit 6 serve as a chop portion, a smoothing reactor, and a free wheeling diode as the current path when the chop portion is in an off state. The components of the switching circuit 7a and the power converting circuit 6 constitute the step-down chopper. This makes it possible to switch charging of the battery from the main battery 3 to the accessory battery 4.

Referring to FIG. 2, the transistor 73 of the switching circuit 7a is brought into an off state, and the transistor 74 is in an on state. The transistor 64 of the second bridge circuit 62 is switched.

Subsequently, an operation at the time of power transfer between the main battery 3 and the auxiliary battery 4 in the power source unit 1a will be described. Power transfer between the main battery 3 and the auxiliary battery 4 is performed by the use of the switching circuit 7a and the power converting circuit 6.

In FIG. 2, the transistors 72, 73 of the switching circuit 7a are set in an on state, the transistor 74 is set in a state of switching between on and off, and one of the transistors 64 of the second bridge circuit 62 is set in an off state.

As a result, as shown in the exemplary equivalent circuit of FIG. 3, the transistor 74 and the coil 77 of the switching circuit 7a and the diode 65 of the power converting circuit 6 function, respectively, as a chop part, a smoothing reactor, and a free wheeling diode which becomes a current path when the chop part is in an off state, whereby it is possible to constitute a step-down chopper by components of the switching circuit 7a and the power converting circuit 6. Therefore, by switching the transistor 74, charge from the main battery 3 to the auxiliary battery 4 is enabled.

On the other hand, in FIG. 2, the transistor 73 of the switching circuit 7a is set in an off state, the transistor 74 is set in an on state, and the transistors 64 of the second bridge circuit 62 are set in a switching state.

Figure 4:
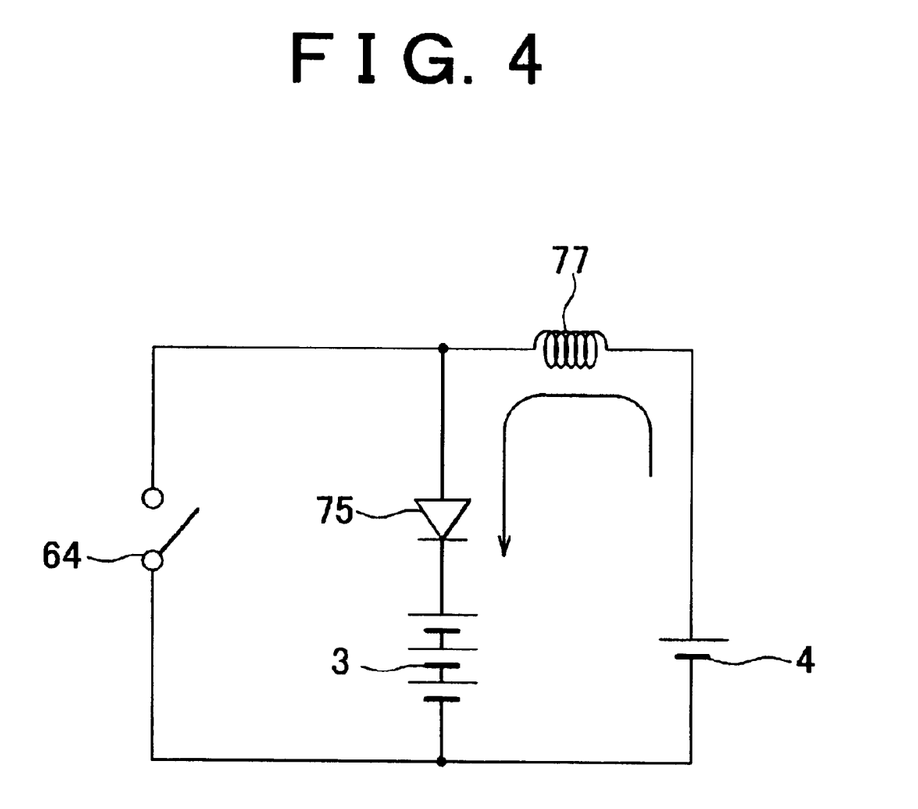
FIG. 4 is an exemplary equivalent circuit view during operation of the power source unit of FIG. 2.

As a result, as shown in an equivalent circuit of FIG. 4, the transistor 64 of the power converting circuit 6 and the coil 77 and the diode 75 of the switching circuit 7a function, respectively, as a chop part, a smoothing reactor, and a fly back diode, whereby it is possible to constitute a step-up chopper by components of the switching circuit 7a and the power converting circuit 6. Therefore, by switching the transistors 64, charge from the auxiliary battery 4 to the main battery 3 is enabled.

As described above, according to the power source unit 1a relating to this embodiment (in addition to the same operation effects as in the power source unit 1 relating to the first exemplary embodiment) by connecting the coil 77 between the main battery 3 and the auxiliary battery 4 via the switching circuit 7a, it is possible to cause the power converting circuit 6 and the switching circuit 7a to function as step-up and step-down choppers. Therefore, without placing a step-up circuit other than the power converting circuit 6 and the switching circuit 7a, power transfer between the main battery 3 and the auxiliary battery 4 is enabled.

Although a power source unit mounted in a vehicle is explained in the aforementioned embodiments, the power source unit relating to the invention may be adapted to a unit other than one mounted in a vehicle.

As explained above, according to the invention, as a result of enabling a switch of connection between the power converting means and the first and second batteries, charge and discharge of the first battery and the second battery is enabled without placing a step-up circuit such as a DC—DC converter other than the power converting means, so that it is possible to reduce costs associated with parts. Moreover, since the inverter is connected to the first battery and the second battery through the power converting means, it is possible to set an input/output voltage on the battery side of the inverter in a high voltage state. As a result, it is possible to use a component of small current type as a component of the inverter, whereby it is possible to downsize the inverter and reduce costs associated with parts.

Furthermore, by connecting the coil between the first battery and the second battery via the switching circuit, it is possible to cause the power conversion device and the switching device to function as step-up and step-down choppers, whereby power transfer between the first battery and the second battery is enabled without additionally including a step-up circuit.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A power source unit comprising:

an inverter connect to a power transfer device;

a first battery that can be charged and discharged through the inverter;

a second battery that can be charged and discharged through the inverter, the second battery having a power voltage lower than a power voltage of the first battery;

a power conversion device that comprises a transformer, a first bridge circuit connected to a primary side of the transformer, and a second bridge circuit connected to a secondary side of the transformer and connected to the inverter, the power conversion device providing a power converting function; and a switching device provided between the first bridge circuit and the first and second batteries, the switching device switching a connection between the power conversion device and the first battery, and the power conversion device and the second battery.

2. The power source unit according to claim 1, wherein the power conversion device further comprises a transformer, a first bridge circuit connected to a primary side of the transformer, and a second bridge circuit connected to a secondary side of the transformer.

3. The power source unit according to claim 2, wherein the switching device further comprises a switching circuit that switches the connection between the power conversion device and the first battery, and the power conversion device and the second battery.

4. The power source unit according to claim 3, wherein the switching device further comprises a coil connected between the first battery and the second battery through the switching circuit.

5. The power source unit according to claim 4, wherein the switching device further comprises at least two switching elements disposed between the first bridge circuit, and the first and the second batteries so as to switch a power transfer operation between the power transfer device and the first battery, and the power transfer device and the second battery.

6. The power source unit according to claim 5, wherein the at least two switching elements further comprise field effect transistors.

7. The power source unit according to claim 5, wherein the coil is connected between the first battery and the second battery through the switching circuit such that the power conversion device and the switching device provide one of a step-up chopper function and a step-down chopper function between the first battery and the second battery for power transfer therebetween.

8. The power source unit according to claim 1, wherein:
the power transfer d vice further comprises a motor generator; and
the inverter allows rectification of an alternating output of the motor generator to charge the first or second batteries so that the motor generator can also be supplied with alternating current.

9. The power source unit according to claim 1, wherein the power source unit is provided in a hybrid vehicle driven by the power transfer device for a running operation.

* * * * *